US008316017B2

(12) United States Patent
Vergnes et al.

(10) Patent No.: US 8,316,017 B2
(45) Date of Patent: Nov. 20, 2012

(54) APPARATUS AND METHOD FOR THE DETECTION OF AND RECOVERY FROM INAPPROPRIATE BUS ACCESS IN MICROCONTROLLER CIRCUITS

(75) Inventors: Alain Vergnes, Trets (FR); Renaud Tiennot, Aix-en-Provence (FR)

(73) Assignee: Atmel Corporation, San Jose, CA (US)

( * ) Notice: Subject to any disclaimer, the term of this patent is extended or adjusted under 35 U.S.C. 154(b) by 983 days.

(21) Appl. No.: 11/426,528

(22) Filed: Jun. 26, 2006

(65) Prior Publication Data

US 2007/0233429 A1 Oct. 4, 2007

(30) Foreign Application Priority Data

Feb. 9, 2006 (FR) ...................................... 06 01168

(51) Int. Cl.
*G06F 7/00* (2006.01)
*G06F 17/30* (2006.01)
*G06F 7/04* (2006.01)
*G06F 11/00* (2006.01)

(52) U.S. Cl. ............................ 707/726; 726/26; 714/6.1
(58) Field of Classification Search .................. 707/726, 707/999.009
See application file for complete search history.

(56) References Cited

U.S. PATENT DOCUMENTS

| 5,142,676 | A | | 8/1992 | Fried et al. | |
| 5,452,239 | A | * | 9/1995 | Dai et al. | 703/19 |
| 5,761,413 | A | * | 6/1998 | Frank et al. | 714/49 |
| 5,987,557 | A | * | 11/1999 | Ebrahim | 710/200 |
| 6,199,167 | B1 | | 3/2001 | Heinrich et al. | |
| 6,212,635 | B1 | | 4/2001 | Reardon | |
| 6,219,786 | B1 | | 4/2001 | Cunningham et al. | |
| 6,704,871 | B1 | * | 3/2004 | Kaplan et al. | 713/192 |
| 2004/0243783 | A1 | | 12/2004 | Ding et al. | |
| 2005/0246613 | A1 | * | 11/2005 | Blaauw et al. | 714/763 |

FOREIGN PATENT DOCUMENTS

EP 1 132 801 A2 9/2001
EP 1258807 A3 11/2005

OTHER PUBLICATIONS

Advanced Encryption Standard (AES), Federal Information Processing Standard Publication 197 (FIPS Pub 197), Nov. 26, 2001.
Data Encryption Standard (DES) Triple Data Encryption Algorithm (TDEA), Federal Information Processing Standard Publication 46-3 (FIPS Pub 46-3), Oct. 25, 1999.
French Preliminary Search Report and Written Opinion issued in France No. 06/01168 on Feb. 9, 2006, 7 pages.

* cited by examiner

*Primary Examiner* — Aleksandr Kerzhner
(74) *Attorney, Agent, or Firm* — Fish & Richardson P.C.

(57) ABSTRACT

An inappropriate-access module is incorporated in a computer system along with other computer system modules. The inappropriate-access module is connected to a read address decoder and controlling logic located within various other modules. The inappropriate-access module detects inappropriate read accesses or the occurrence of the inappropriate access during operations performed on related sensitive system resources in accompanying computer system modules. The inappropriate-access module produces an inappropriate-access flag, made available to the rest of the system, which invokes responses in the accompanying modules such as a halt in processing and protective measures for system resources. Additionally, a related logic block is able to detect the inappropriate access and produce an inappropriate-access trigger which causes a halt to processing within the logic block as well as in related system modules.

20 Claims, 3 Drawing Sheets

Fig._2

APPARATUS AND METHOD FOR THE DETECTION OF AND RECOVERY FROM INAPPROPRIATE BUS ACCESS IN MICROCONTROLLER CIRCUITS

TECHNICAL FIELD

The present invention relates to computer systems and the detecting and reporting of inappropriate accesses. More particularly, the invention relates to a sensing device for detecting an access to system resources during an inappropriate period of time, reporting the occurrence of the access to the rest of the system, and/or suspending execution of a process.

BACKGROUND ART

Computer systems are incorporated into an increasing number of facets of a person's daily life. Computer systems are responsible for carrying out ever increasing numbers of tasks for people on a daily basis. In order for computer systems to carry out this growing number of tasks, an increasing number of applications from multiple sources must be incorporated and connections to expansive communication networks must take place. Through network connections as well as from (unintentionally) running inappropriate applications, computer systems are exposed to an increasing number of inappropriate accesses to the systems processes and information. Inappropriate access to processes and information may range from being inconvenient to being of a malicious nature, especially where sensitive data retrieval is the result of such an inappropriate access and transmission back to an inappropriate source is a goal.

Typically, it is difficult for a computer system to detect a condition where an access (i.e., a read access or write access) occurs during an inappropriate period of time, such as when a process involving that resource is underway. A computer system may miss detection of many inappropriate accesses without specific hardware to assist in sensing accesses generally. It would be highly desirable for a computer system to be able to detect access to a critical system resource during processing operations involving the same or related system resources. In addition, it would be highly desirable for a system to be able to detect such an inappropriate access and to determine whether and when to cease processing operations on all related critical system resources.

SUMMARY

A computer system incorporates a range of system modules for carrying out operations relating to a general process capability of the system. An additional system module is used for detection of accesses to system resources during general processing related to the same system resources. The additional system module is an inappropriate-access module which is equipped with a sense circuit that is able to detect an access to a critical system resource. The particular access indication relates to one or more read or write accesses to critical system resources, such as registers or data line containing process sensitive information. The inappropriate-access module is also able to detect concurrent processing in a system operation related to the system resources targeted by a read or write access. A read or write access is an inappropriate access when made concurrently with processing related to the same (i.e., a first) system resource or a concurrent access to an associated system resource related to the processing of the first system resource. When the read access occurs during the related system operation an inappropriate-access flag is produced.

The inappropriate-access module propagates the inappropriate-access flag to a sample-and-hold circuit. The sample-and-hold circuit retains the inappropriate-access flag until the computer system issues a corresponding reset flag in acknowledgment of receiving the inappropriate access. The inappropriate-access flag serves to signal the CPU and other systems applications that the inappropriate access has occurred. The CPU or system application may take appropriate response to the inappropriate-access flag and cease processing, protect system resources such as registers and data lines, or revert to a previous state of processing for recovery.

The inappropriate-access flag is also propagated to a logic block where an inappropriate-access trigger is produced. The inappropriate-access trigger is able to invoke a response in other logic functions within the same logic block as well as invoke responses in related computer system modules. The inappropriate-access trigger causes logical operations to cease immediately within the related computer system modules the trigger is connected to.

The inappropriate-access module provides a mechanism for monitoring critical read accesses, determining that the critical read access occurs during a related sensitive process, and generates a system flag capable of halting processing and protecting system resources. The related inappropriate-access trigger, developed in the logic block, detects that an inappropriate-access has occurred and produces an inappropriate-access trigger which may cause immediate cessation of processing and an ability to protect system resources from an errant or inappropriate source.

DETAILED DESCRIPTION

Figure 1:
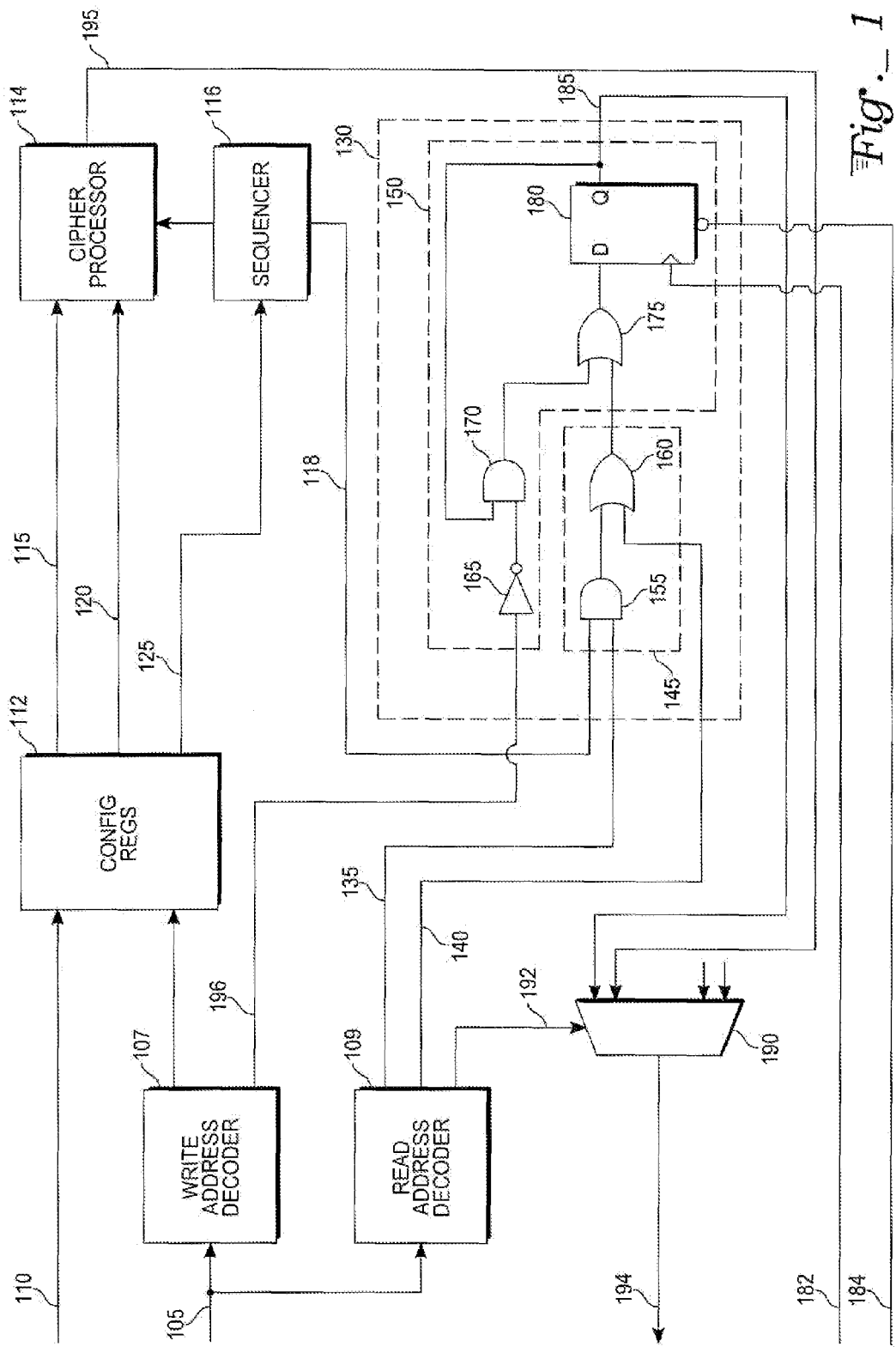
FIG. 1 is an exemplary computer system block diagram including a block diagram of an exemplary inappropriate-access module according to the present invention.

With reference to FIG. 1, in an exemplary computer system, an address bus 105 connects to a write-address decoder WRITE ADDRESS DECODER 107 and a read-address decoder READ ADDRESS DECODER 109. An output of the write-address decoder 107 and a write-data bus 110 connect to a configuration-register block CONFIG REGS 112. The configuration-register block 112 connects to a cipher processor CIPHER PROCESSOR 114 through a plain-text line 115 and a user-key line 120. A start-command line 125 connects from an output of the configuration-register block 112 to a sequencer SEQUENCER 116. The sequencer 116 connects to the cipher processor 114 and through a process-status line 118 to an inappropriate-access module 130. The read-address decoder 109 connects to the inappropriate-access module 130 through a read-cipher line 135 and a read-key line 140.

An exemplary embodiment of the inappropriate-access module 130 contains a sense circuit 145 and a sample-and-hold circuit 150. The sense circuit 145 contains a first AND gate 155 and a first OR gate 160. The read-cipher line 135 connects to the first AND gate 155 and the read-key line 140 connects to the first OR gate 160. The process-status line 118 connects from an output of the sequencer 116 to an input of the first AND gate 155.

The sample-and-hold circuit 150 contains an inverter 165, a second AND gate 170, a second OR gate 175, and a D flip-flop 180. An output of the write-address decoder 107 and connects through a reset flag line 196 to the inverter 165. An output of the inverter 165 connects to an input of the second AND gate 170. An output of the sense circuit 145 and an output of the second AND gate 170 connect to inputs of the second OR gate 175. An output of the second OR gate 175 connects to an input D of the D flip-flop 180. A clock line 182 connects to a clock input and a reset line 184 connects to a reset input of the D flip-flop 180. The output Q of the D flip-flop 180 connects to an input of the second AND gate 170. A latch loop is formed by the output Q of the D flip-flop 180 connecting to an input of the second AND gate 170 and the connections between the second AND gate 170, the second OR gate 175, and the input D of the D flip-flop 180. An inappropriate-access line 185 connects from the D flip-flop output Q to an input of a read multiplexer 190. An output of the cipher processor 114 connects through a cipher-text line 195 to an input of the read multiplexer 190. An output of the read-address decoder 109 connects through a read-select line 192 to the read multiplexer 190. The output of the read multiplexer 190 connects to a read-data bus 194.

In an exemplary computer system with inappropriate access detection, functional modules are provided with signals and data controlled by a central processor unit CPU (not shown). The address bus 105 provides addresses to two functional modules the write-address decoder 107 and the read-address decoder 109. Write data is applied to the configuration-regulater block 112 through the write-data bus 110 and is routed to a configuration register corresponding to a write address provided by the write-address decoder 107. One uniquely chosen address is used to provide a reset flag to potentially many computer system modules on the reset-flag line 196.

A cipher process is controlled by the CPU in conjunction with various computer system modules. Configuration registers (not shown) in the configuration-register block 112 are filled with information in order to provide commands and data for the cipher process. Plain text and a user key, for instance, are provided from the configuration-register block 112 to the cipher processor 114 by the plain-text line 115 and the user-key line 120 respectively. The sequencer 116 provides process specific commands to the cipher processor 114. Operation of the sequencer 116 is initiated by a start command signal provided from a configuration register through the start-command line 125.

During the course of sequencer operations a process-underway signal is produced on the process-status line 118. The process-underway signal is an indication, made available to computer system modules, that a process is underway and is managed, for example, by the sequencer 116. The cipher processor 114 produces cipher text to the read multiplexer 190 through the cipher-text line 195. The cipher text is provided to the read-data bus 194 by a corresponding read-cipher address produced by the read-address decodedr 109 over the read-select line 192. The read-cipher address is decoded within the read multiplexer 190 to provide a connection from the cipher-text line 195 to the read-data bus 194.

Any read or write access of resources critical to the cipher process, for example, which is initiated concurrent with cipher operations is considered an inappropriate access. During cipher processing another process executing on the system or another system module may, intentionally or unintentionally, initiate a read operation to access the cipher text or user key. The inappropriate-access module 130 detects both the process-underway signal from the sequencer 116 and any read accesses of relevance to the cipher process occurring inappropriately and concurrently with cipher operations and determines that an inappropriate access has occurred. The inappropriate-access module 130 produces an inappropriate-access flag through the inappropriate-access line 185 when the inappropriate access occurs.

The sense circuit 145 of the inappropriate-access module 130 detects both process critical read operations and a status of the process. The inappropriate-access module 130 detects the process-underway signal through the process-status line 118. The process-underway signal is connected through the process-status line 118 to the first AND gate 155 in the sense circuit 145. A read-cipher signal, indicating the cipher is being read, is produced through the read-cipher line 135 and propagated to the first AND gate 155. If the read-cipher signal and the process underway signal are received simultaneously then an inappropriate high access flag is produced at the output of the first AND gate 155 indicating an inappropriate access has occurred due to reading a cipher during cipher operations.

If a user key is being read a read-user-key signal is produced by the read-address decoder 109. The read-address decoder 109 is modified to add the decoding logic necessary to detect reading of the user key and produce the read-user-key signal. Additional circuitry in the read-address decoder 109 is created to decode addresses corresponding to accesses to the cipher and the user key. As the additional circuitry decodes addresses corresponding to the cipher and the user key, the read-cipher signal and a read-user-key signal are produced. The read-user-key signal is propagated from the read-address decoder 109 through the read-key line 140 to an input of the first OR gate 160. Logically, when they occur, either the read-user-key signal or the read-cipher signal are propagated to an output of the sense circuit 145 which comes from the first OR gate 160. The output of the sense circuit 145 is connected to the second OR gate 175 in the sample-and-hold circuit 150. The sample-and-hold circuit 150 is used to retain any signaling from the sense circuit 145 where a determination is made that the inappropriate access has occurred.

The inappropriate-access flag is produced on an output of the inappropriate-access module 130 and propagates over the inappropriate-access line 185. The inappropriate-access flag is produced at the output Q of the D flip-flop 180 and is connected to an input of the second AND gate 170. The connection from the output Q of the D flip-flop 180, through the second AND gate 170, and through the second OR gate 175 to the input D of the D flip-flop 180 provides a feedback latch loop that maintains a record of the inappropriate access. Once set, the record of the inappropriate access is maintained until the reset flag is received from the write address decoder 107 through the reset-flag line 196 and the inverter 166. Any time the user key is read or there is an occurrence of the cipher being read during cipher processing the inappropriate access flag is produced. The inappropriate access flag serves to notify the CPU or other computer system modules of the occurrence of the inappropriate access. The CPU or system applications executing on the CPU may take advantage of the inappropriate-access flag and cease any further operations in the related process, protect related system resources, such as registers or data lines, or revert to a previous system state to recover from the inappropriate access.

Additionally, the inappropriate-access module may be used to assist in debug operations. A debugger or in-circuit emulation device may perform an access to a system resource at an inappropriate time. The inappropriate-access module detects a result of an inappropriate access where, for example, an interrupt has not been triggered before the access. Without the interrupt the debugger may make a read or write access that is detected at an inappropriate time. Detection of such a condition may provide input for correcting the debug operation or nullify an incorrect report by the debugger.

Figure 2:
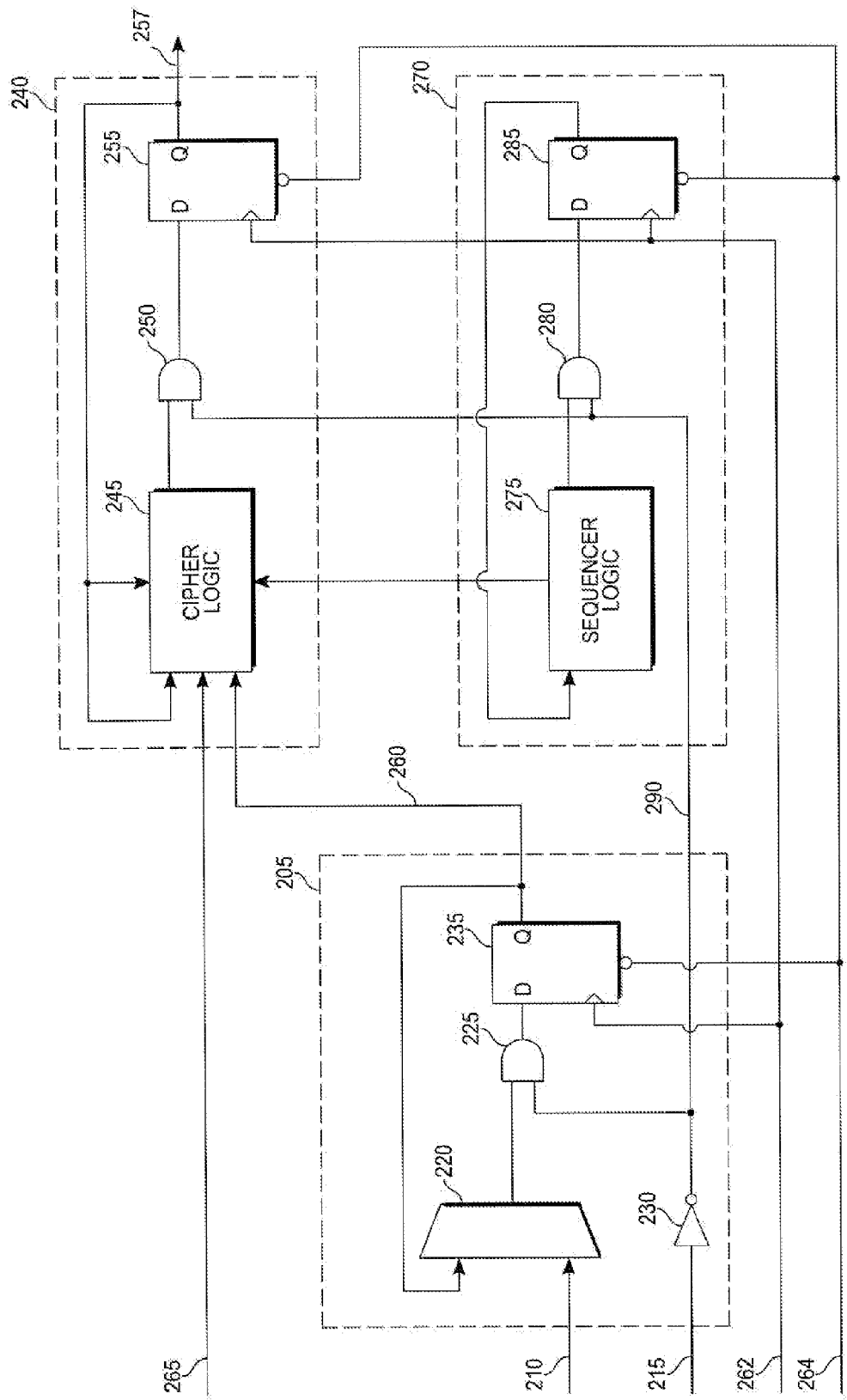
FIG. 2 is an exemplary inappropriate-access-logic-block diagram according to the present invention.

With reference to FIG. 2, in an exemplary embodiment of the inappropriate access module, a logic block 205 contains a multiplexer 220, a first AND gate 225, an inverter 230, and a first D flip-flop 235. A write-data bus 210 connects to an input of the multiplexer 220 and an inappropriate-access line 215 connects to the inverter 230. An output of a multiplexer 220 connects to a first input of the first AND gate 225. An output of the inverter 230 connects through an inappropriate-access line 290 to a second input of the first AND gate 225. An output of the first AND gate 225 connects to an input D of the first D flip-flop 235. An output Q of the first D flip-flop 235 connects to an input of the multiplexer 220 through a user-key line 260. A feedback latch loop is formed by connections between an output of the first AND gate 225 to an input D of the first D flip-flop 235, an output Q of the first D flip-flop 235 to an input of a multiplexer 220, and an output of the multiplexer 220 to an input of the first AND gate 225. A clock line 262 connects to a clock input and a reset line 264 connects to a reset input of the first D flip-flop 235.

A cipher processor 240 contains a cipher-logic block CIPHER LOGIC 245, a second AND gate 250, and a second D flip-flop 255. An output of the cipher-logic block 245 connects to an input of the second AND gate 250 and an output of the second AND gate 250 connects to an input D of the second D flip-flop 255. The inappropriate-access line 290 connects to an input of the second AND gate 250. An output Q of the second D flip-flop 255 connects to inputs of the cipher-logic block 245 and to a cipher-text line 257. A plain-text line 265 and the user-key line 260 connect to inputs of the cipher-logic block 245. A feedback latch loop is formed by the connections between the output Q of the second D flip-flop 255 to an input of the cipher-logic block 245, an output of the cipher-logic block 245 to an input of the second AND gate 250, and an output of the second AND gate 250 to the input D of the second D flip-flop 255. The clock line 262 connects to a clock input and the reset line 264 connects to a reset input of the second D flip-flop 255.

A sequencer block 270 contains a sequencer-logic block SEQUENCER LOGIC 275, a third AND gate 280, and a third D flip-flop 285. An output of the sequencer-logic block 275 connects to an input of the third AND gate 280 and an output of the third and gate 280 connects to an input D of the third D flip-flop 285. An output Q of the third D flip-flop 285 connects to an input of the sequencer-logic block 275. The inappropriate-access line 290 connects to an input of the third AND gate 250. An output of the sequencer-logic block 275 connects to the cipher-logic block 245. A feedback latch loop is formed by the connections between an output of the third AND gate 280 to the input D of the third D flip-flop 285, an output Q of the third D flip-flop 285 to an input of the sequencer-logic block 275, and an output of the sequencer-logic block 275 to an input of the third AND gate 280. The clock line 262 connects to a clock input and the reset line 264 connects to a reset input of the second D flip-flop 285.

In an exemplary embodiment, during normal operation, no inappropriate-access flag is broadcast, for example from the inappropriate-access module 130 (FIG. 1), and a low-level signal is propagated through the inappropriate-access line 215 to the inverter 230 of the logic block 205. As a result, a high-level signal is produced at the output of the inverter 230 and is propagated over the inappropriate-access line 290. The logic block 205 receives user-key data through the write-data bus 210 to the multiplexer 220. The user-key data propagates through the first AND gate 225 to the input D of the first D flip-flop 235. Once captured by the first D flip-flop 235, user-key data is propagated through a latch loop formed by the output Q of the first D flip-flop 235, the connection to an input of the multiplexer 220, a selection path through the multiplexer 220, and the path through the first AND gate 225 to the input D of the first D flip-flop 235. The high-level signal at the output of the inverter 230 enables propagation of the user-key data through the first AND gate 225.

The sequencer 270 receives the high-level signal from the inverter 230 through the inappropriate-access line 290. The sequencer-logic block 275 propagates control data through the third AND gate 280, through the third D flip-flop 285, from the input D to the output Q, and back to an input of the sequencer-logic block 275. The high-level signal from the inverter 230 is applied to an input of the third AND gate 280 which allows propagation of the control data through the third AND gate 280.

The cipher-logic block 245 receives plaintext data through the plain-text line 265 and user-key data through the user-key line 260 through inputs of the cipher processor 240. The control data is received by the cipher-logic block 245 through the connection from the sequencer-logic block 275. Cipher text is propagated through the second AND gate 250 to the input D of the second D flip-flop 255. A latch loop is formed from the output Q of the second D flip-flop 255 to an input of the sequencer-logic block 275.

If an inappropriate access is determined by, for instance, an inappropriate-access module 130 (FIG. 1), a high-level signal is produced on the inappropriate-access line 215. The inverter 230 receives the high-level signal indicating the inappropriate access has occurred and produces an inappropriate-access trigger (a low-level signal) on the inappropriate-access line 290. The low level of the inappropriate-access trigger on the inappropriate-access line 290 disrupts the propagation path through the respective latch loops of the first AND gate 225, the second AND gate 250, and the third AND gate 280. With propagation through the respective latch loops disrupted, all processing halts in the logic block 205 with respect to user-key data, in the cipher processor 240, and in the sequencer 270. In this way the logic block 205 detects the presence of an inappropriate access and causes the suspension of processes in the logic block 205 and related computer system modules with use of the inappropriate-access trigger.

Figure 3:
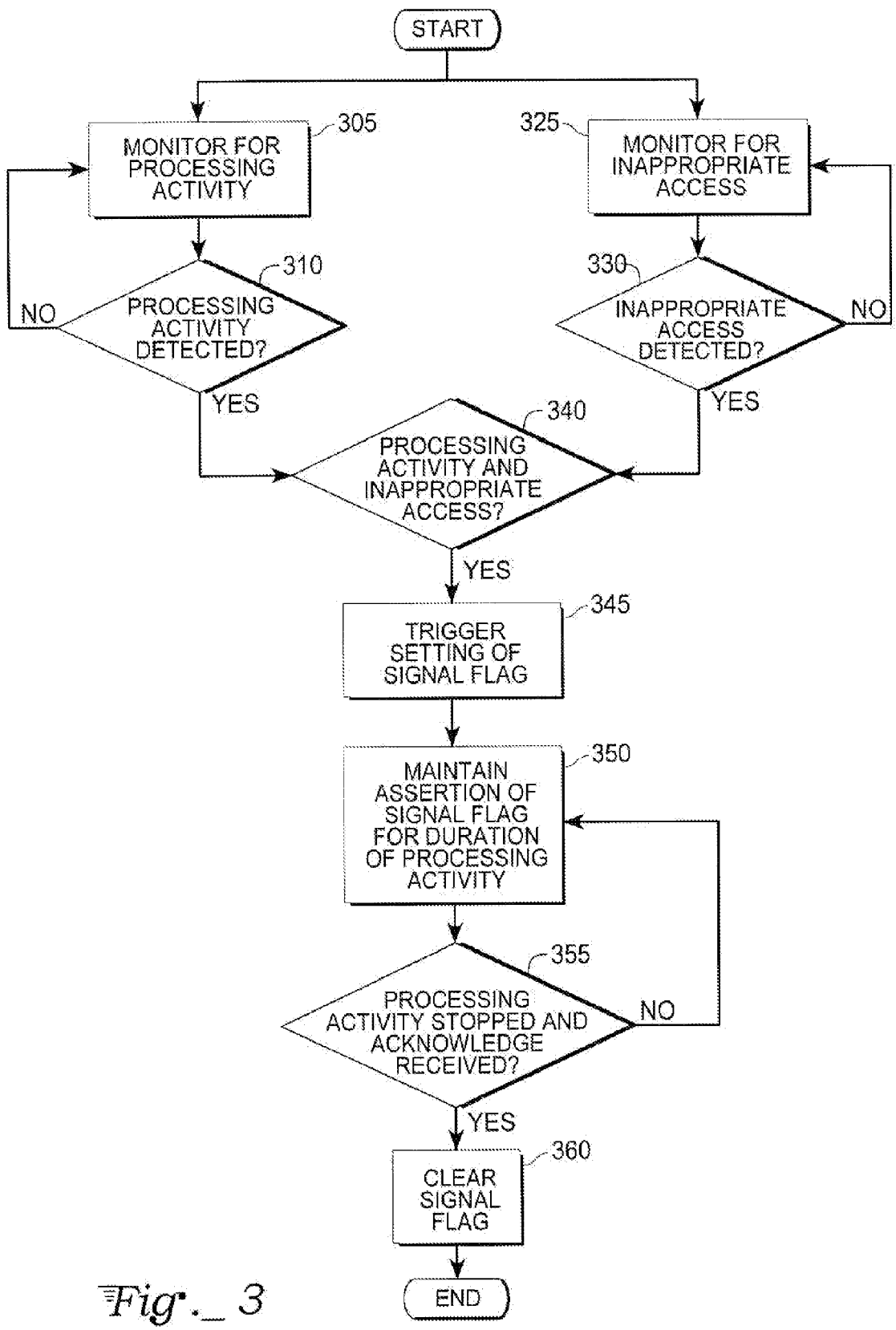
FIG. 3 is an exemplary process flow diagram of detection of an inappropriate access during processing activity.

With reference to FIG. 3, an exemplary detection of an inappropriate access during processing activity commences with monitoring 305 for processing activity and determining 310 if processing activity is detected. The process continues with monitoring 325 for an inappropriate access to computer system resources and determining 330 if the inappropriate access has occurred. A system resource targeted for an inappropriate access may be, for example, a register containing a value to be applied in the processing activity or a quantity that is the result of the processing activity.

A next step in the process is determining 340 if the inappropriate access has occurred during the period that processing activity is detected. If the determination of the inappropriate access occurring during processing activity is affirmed, the process proceeds with triggering 345 a signal flag to be set and maintaining 350 assertion of the signal flag for the duration of processing activity. The process continues with determining 355 if the processing activity is stopped and an acknowledge signal is received. If the determination is that processing activity is not stopped or the acknowledge signal is not received, the process returns to the step of maintaining 350 assertion of the signal flag. If the determination is that processing activity is stopped and the acknowledge signal is received, the process concludes with clearing 360 the signal flag.

While various portions of an inappropriate access reporting module have been depicted with exemplary components and configurations, an artisan in the computer systems field would readily recognize alternative embodiments for accomplishing a similar result. For instance, a sense circuit has been shown as an AND gate for determining a simultaneous occurrence of two trigger events in combination with an OR gate to produce, alternatively, a singular detection trigger. One skilled in the art would readily recognize that detection of similar events through signals may be detected by other forms of logic gates. For example, combinatorial logic gates, such as NAND or NOR gates or sequential logic such as latches, toggle flip-flops, or master-slave flip-flops may be used to accomplish the same result. One skilled in the art would also recognize an ability to combine further inputs to the combinatorial logic to effect detection of more events.

Even though a gating function has been represented as an AND gate with a gating signal applied to one input, an artisan in the field would recognize a possibility for various alternatives for implementing a gating function. For example, one skilled in the art would recognize that a signal may be gated or masked by a high logic level applied to a NOR gate with a series inverter at an output. Alternatively a mask gate may be implemented by a low logic level applied to a NAND gate with a series inverter at an output. In yet another alternative a CMOS transmission gate may be used as a gating function where a gating signal is applied to one input of the transmission gate and an inverter is used to drive the other input.

Additionally, though a sample-and-hold circuit has been shown as a D flip-flop element with a feedback loop including a gating function, one skilled in the art would readily conceive of alternatives for the same recording function. For example, the skilled artisan would readily conceive of alternate storage means such as a latch for storing a record entry for an event such as an inappropriate access in the present invention. Further, one skilled in the art would conceive of several latching elements or toggle flip-flops capable of maintaining a record of events and additionally keeping a count of the number of occurrences of the trigger event by implementing a ripple carry connection among latch elements.

What is claimed is:

1. A computer system module comprising:
    a sense circuit coupled to a first system resource, the sense circuit configured to:
        detect an inappropriate access to the computer system during a processing activity involving the first system resource, the inappropriate access including either an access of the first system resource involved in the processing activity or an access of at least one of any further system resources associated with the processing activity involving the first system resource, and
        upon detection of the inappropriate access activate a signal flag indicating the inappropriate access;
    a sample-and-hold circuit coupled to the sense circuit and configured to:
        receive the signal flag from the sense circuit;
        generate an inappropriate access signal based on the signal flag; and
        forward the inappropriate access signal to a gating logic circuit,
        the sample-and-hold circuit including a feedback latch loop that is configured to retain a record of the inappropriate access upon receiving the signal flag from the sense circuit, the record of the inappropriate access being maintained until a reset flag is received; and
    the gating logic circuit that is configured to respond to the inappropriate access signal by generating a trigger on an access line coupled to the first system resource such that the processing activity involving the first system resource is halted.

2. The computer system module of claim 1, further comprising the signal flag signaling an application that the inappropriate access has occurred.

3. The computer system module of claim 2, wherein the sense circuit is coupled to a debugger configured to ensure no conflicts are produced by the debugger in debug operations.

4. The computer system module of claim 1, further comprising a logic module coupled to the sense circuit and configured to provide recovery from the inappropriate access after receiving the signal flag, the recovery including protecting the at least one of any further system resources associated with the processing activity involving the first system resource.

5. The computer system module of claim 4, wherein the processing activity is terminated by the logic module propagating the signal flag to at least one gating logic block in the logic module coupled to the first system resource and at least one of any further gating logic blocks, the signal flag causing a shift in a logical state of the respective gating logic blocks, the shift in state halting propagation of signals involving associated processing paths relating to the processing activity.

6. The computer system module of claim 4, wherein the at least one of any further system resources comprises a register.

7. The computer system module of claim 4, wherein the protection includes the at least one of any further system resources being cleared by setting elements of the at least one of any further system resources to one of: a known-good state, a single logic level and a predetermined value.

8. The computer system module of claim 1, further comprising an additional gating logic configured to respond to the signal flag to disrupt an additional processing path associated with the processing activity.

9. The computer system module of claim 1, wherein the sense circuit is configured to detect the inappropriate access based on a combination of a signal from a first line indicating the processing activity is under way and a signal from a second line from a decoder indicating that data associated with the first system resource is being read.

10. The computer system module of claim 1, further comprising a logic module coupled to the sense circuit and configured to provide recovery from the inappropriate access after receiving the signal flag and revert the computer system to a previous state of operation.

11. The computer system module of claim 1, further comprising a logic module coupled to the sense circuit and configured to provide recovery from the inappropriate access after receiving the signal flag and set circuit elements of the at least one of any further modules to a known-good state.

12. The computer system module of claim 1, further comprising a logic module coupled to the sense circuit and configured to provide recovery from the inappropriate access after receiving the signal flag and set elements of the at least one of any further modules to a single logic level.

13. The computer system module of claim 1, wherein the first system resource includes a cipher processor.

14. A method comprising:
   detecting a processing activity in a computer system;
   detecting an inappropriate access to the computer system during the processing activity, the inappropriate access including at least one access of a first system resource involved in the processing activity or an access of at least one of any further system resources associated with the processing activity involving the first system resource;
   triggering activation of a signal flag indicating the inappropriate access has been detected;
   asserting the signal flag for a remainder of the processing activity by retaining a record of the inappropriate access using a feedback latch loop in a sample-and-hold circuit, the record of the inappropriate access being maintained until a reset flag is received; and
   propagating the signal flag to a gating logic circuit that is configured to respond to the inappropriate access by generating a trigger on an access line coupled to the first system resource such that the processing activity involving the first system resource or the at least one of any further system resources is halted.

15. The method of claim 14, wherein assertion of the signal flag is maintained until a reset signal is received.

16. The method of claim 14, further comprising the signal flag signaling an application that the inappropriate access has occurred.

17. The method of claim 14, further comprising logging a record of the inappropriate access.

18. The method of claim 14, wherein the at least one of any further system resources includes at least one of: a register; combinatorial logic; and a data line.

19. The method of claim 14 further comprising:
   setting circuit elements of the at least one of any further system resources to a known good state.

20. A computer system module comprising:
   a sense circuit coupled to a read address decoder and a system resource, the sense circuit configured for performing operations comprising:
      receiving a first signal from the system resource indicating a processing activity associated with the system resource;
      receiving a second signal from the read address decoder indicating a read access of the system resource in parallel with receiving the first signal;
      responsive to receiving the second signal in parallel with receiving the first signal, determining an inappropriate access of the system resource; and
      based on determining the inappropriate access of the system resource, generating a signal flag indicating the inappropriate access; and
   a sample-and-hold circuit coupled to the sense circuit and a write address decoder, the sample-and-hold circuit configured for performing operations comprising:
      receiving the signal flag from the sense circuit;
      generating an inappropriate access signal at an output of the sample-and-hold circuit based on receiving the signal flag; and
      retaining a record of the inappropriate access using a feedback latch loop included in the sample-and-hold circuit, the record of the inappropriate access being maintained until a reset flag is received from the write address decoder,
   the inappropriate access signal being received by a gating logic circuit that is configured for generating a trigger signal responsive to the inappropriate access signal such that the processing activity associated with the system resource is halted.

* * * * *

UNITED STATES PATENT AND TRADEMARK OFFICE
CERTIFICATE OF CORRECTION

| | |
|---|---|
| PATENT NO. | : 8,316,017 B2 |
| APPLICATION NO. | : 11/426528 |
| DATED | : November 20, 2012 |
| INVENTOR(S) | : Alain Vergnes et al. |

It is certified that error appears in the above-identified patent and that said Letters Patent is hereby corrected as shown below:

Column 1, line 60, please delete "line" and insert therefor -- lines --;

Column 3, line 33, please delete "regulater" and insert therefor -- register --;

Column 3, line 59, please delete "decodedr" and insert therefor -- decoder --;

Column 3, line 64, please delete "concurrent" and insert therefor -- concurrently --;

Column 4, line 54, please delete "166." and insert therefor -- 165. --; and

Column 5, line 49, please delete "and" and insert therefor -- AND --.

Signed and Sealed this
Fifth Day of February, 2013

Teresa Stanek Rea
*Acting Director of the United States Patent and Trademark Office*